(12) United States Patent
Shin et al.

(10) Patent No.: US 7,462,131 B2
(45) Date of Patent: Dec. 9, 2008

(54) PRESSURE CONTROL SYSTEM FOR AUTOMATIC TRANSMISSION

(75) Inventors: Byung Kwan Shin, Hwasung-si (KR); Jin Mo Park, Kwachun-si (KR); Jong Sool Park, Suwon-si (KR); Hyeog June Lee, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 365 days.

(21) Appl. No.: 11/333,601

(22) Filed: Jan. 17, 2006

(65) Prior Publication Data

US 2006/0252599 A1  Nov. 9, 2006

(30) Foreign Application Priority Data

May 3, 2005 (KR) .................... 10-2005-0037146

(51) Int. Cl.
*F16H 61/26* (2006.01)
*B60W 10/00* (2006.01)
(52) U.S. Cl. .................... 477/130; 477/79; 475/120
(58) Field of Classification Search ............ 477/70, 477/71, 79; 475/116, 120, 172
See application file for complete search history.

(56) References Cited

U.S. PATENT DOCUMENTS

| | | | | |
|---|---|---|---|---|
| 5,251,443 A | * | 10/1993 | Ehrlinger et al. | 60/426 |
| 5,486,146 A | * | 1/1996 | Asahara et al. | 477/65 |
| 7,300,383 B2 | * | 11/2007 | Nozaki et al. | 477/131 |
| 2007/0149355 A1 | * | 6/2007 | Shin et al. | 477/127 |

FOREIGN PATENT DOCUMENTS

| | | |
|---|---|---|
| JP | 06-328950 | 11/1994 |
| JP | 2000-239278 | 9/2000 |
| JP | 2002-195376 | 7/2002 |

* cited by examiner

*Primary Examiner*—Tisha D Lewis
(74) *Attorney, Agent, or Firm*—Morgan, Lewis & Bockius LLP

(57) ABSTRACT

A pressure control system of an automatic transmission includes a control-pressure regulating valve, a path switching valve, and a coupling-pressure regulating valve. The path switching valve selectively outputs a control pressure or a line pressure, so that the coupling-pressure regulating valve regulates a coupling pressure based on the control pressure during gear shifting, and regulates the coupling pressure based on the line pressure after completion of the gear shifting.

12 Claims, 8 Drawing Sheets

PRESSURE CONTROL SYSTEM FOR AUTOMATIC TRANSMISSION

CROSS-REFERENCE TO RELATED APPLICATION

This application claims priority to and the benefit of Korean Patent Application No. 10-2005-0037146 filed in the Korean Intellectual Property Office on May 3, 2005, the entire contents of which are incorporated herein by reference.

BACKGROUND OF THE INVENTION

1. Field of the Invention

The present invention relates to a pressure control system for use with an automatic transmission, and, more particularly, to such a system in which a coupling pressure, supplied to frictional elements of the automatic transmission during gear shifting, is regulated based on a control pressure output from a control-pressure regulating valve during the gear shifting, and is regulated by a line pressure after completion of the gear shifting.

2. Description of the Related Art

Generally, a clutch and a brake, corresponding to frictional elements of an automatic transmission, are devices to realize restrictions for attaining desired gear positions during the traveling of a vehicle. The clutch and brake are usually operated or released by the use of a hydraulic pressure.

To prevent slippage during gear shifting, the frictional elements must receive a maximum hydraulic pressure corresponding to a torque of the respective frictional elements based on a maximum input torque per each gear position. Also, the frictional elements must receive an accurately controlled hydraulic pressure belonging to an appropriate hydraulic pressure control range (hereinafter, referred to as a coupling pressure), for the sake of a smooth shifting feeling. In a conventional system, the control pressure is generally regulated by a control pressure regulating valve.

However, conventional pressure control systems for use with an automatic transmission frequently have a problem in that the control pressure of the control-pressure regulating valve has a limited control range since the hydraulic pressure control range outputted during the gear shifting is less than the maximum pressure. Further, since the coupling pressure has a high sensibility for the variation of the control pressure of the control-pressure regulating valve, shift feeling largely varies in accordance with a deviation of the control pressure of the control-pressure regulating valve.

Moreover, when the torque of the respective frictional elements per each gear position largely varies as like a six-speed automatic transmission, there can be a technical problem in that the hydraulic pressure control range outputted during the gear shifting is extremely limited to approximately 20 to 30% of the maximum pressure.

As a result, in the case of gear shifting from a gear position having a low torque, the displacement of the coupling pressure in accordance with the variation of the control pressure of the control-pressure regulating valve. inevitably increases due to the narrow control pressure range of the control-pressure regulating valve. That is, a coupling-pressure regulating valve can exhibit a high sensibility for an input to output ratio, causing a shock during the gear shifting.

For example, as shown in FIG. 1, when the control pressure range of the proportional-control solenoid valve is approximately 1.5 bar to 5.5 bar, and the coupling pressure to be supplied from the coupling-pressure regulating valve to a corresponding frictional element is regulated to a range of approximately 0 bar to 5 bar, an actual control range X of the control-pressure regulating valve is limited to approximately 1.5 bar to 3.5 bar.

Accordingly, the coupling pressure to be supplied from the coupling-pressure regulating valve to the corresponding frictional element largely varies based on the control pressure supplied from the proportional-control solenoid valve to the coupling-pressure regulating valve, resulting in an increase in the sensibility of gear shifting.

SUMMARY OF THE INVENTION

Embodiments of the present invention provide a pressure control system for use with an automatic transmission in which a coupling pressure, supplied to frictional elements of the automatic transmission during gear shifting, is regulated based on a control pressure outputted from a control-pressure regulating valve during the gear shifting, and is regulated by a line pressure after completion of the gear shifting, thereby maximizing the control pressure range of the control-pressure regulating valve.

In an exemplary embodiment of the present invention, a pressure control system of an automatic transmission comprises a control-pressure regulating valve to regulate a reducing pressure to an appropriate control pressure in accordance with the control of a transmission control unit, a path switching valve to output the control pressure regulated in the control-pressure regulating valve during gear shifting, and to output a line pressure after completion of the gear shifting, and a coupling-pressure regulating valve to regulate a coupling pressure to be supplied to a frictional element based on the control pressure or the line pressure outputted from the path switching valve.

The control-pressure regulating valve may be a proportional-control solenoid valve to allow the control pressure outputted from the control-pressure regulating valve to vary in accordance with the control of the transmission control unit.

The path switching valve may include a pressure receiving portion to receive the control pressure outputted from the control pressure regulating valve, a reaction force portion to provide a reaction force against the control pressure inputted into the pressure receiving portion, and an output pressure switching portion to output the control pressure outputted from the control-pressure regulating valve during gear shifting and to output the line pressure after completion of the gear shifting in accordance with the force-equilibrium relationship between the pressure receiving portion and the reaction force portion.

The reaction force portion may include an elastic member and may provide the reaction force by use of the reducing pressure of the control-pressure regulating valve.

The path switching valve may further include a reaction force pressure regulating valve to regulate the reducing pressure to an appropriate reaction force pressure in accordance with the control of the transmission control unit, and the reaction force portion may provide the reaction force by use of the reaction force pressure of the reaction force pressure regulating valve.

The path switching valve may include a pressure receiving port and a first input port to receive the control pressure of the control-pressure regulating valve, respectively, a second input port to receive the line pressure, an output port connected to the coupling-pressure regulating valve, an elastic member to provide a reaction force against the control pressure inputted via the pressure receiving port, and a switching land to connect the output port with one of the first and second input ports in accordance with the force-equilibrium relationship between the elastic member and the control pressure inputted via the pressure receiving port.

The path switching valve may further include a reaction force pressure regulating valve controlled by the transmission control unit to provide a reaction force pressure, and a reaction force pressure input port to receive the reaction force pressure of the reaction force pressure regulating valve, so as to provide a reaction force against the control pressure inputted via the pressure receiving port.

The path switching valve may further include a reaction force pressure input port to receive the reducing pressure of the control-pressure regulating valve, so as to provide a reaction force against the control pressure inputted via the pressure receiving port.

The switching land may include a first land portion to selectively connect the output port to the first input port and to receive the control pressure inputted via the pressure receiving port, and a second land portion to selectively connect the output port to the second input port and to receive the reaction force, and the first and second land portions may cooperate with each other, and facing pressure receiving sides of the first and second land portions may have the same area as each other.

The coupling-pressure regulating valve may include a pressure receiving portion to receive the control pressure or the line pressure outputted from the path switching valve, a reaction force portion to provide a reaction force against the pressure inputted into the pressure receiving portion, a coupling-pressure regulating portion to regulate the line pressure to the coupling pressure to be supplied to the frictional element in accordance with the force-equilibrium relationship between the pressure receiving portion and the reaction force portion, and a feedback portion to feedback part of the coupling pressure outputted from the coupling-pressure regulating valve, into the reaction force portion.

The reaction force portion may include an elastic member.

The coupling-pressure regulating valve may include a pressure receiving port to receive the control pressure or the line pressure outputted from the path switching valve, an input port to receive the line pressure, a discharge port to discharge the coupling pressure to the outside, an output port to output the coupling pressure to the frictional element, a feedback port to receive part of the coupling pressure outputted from the coupling-pressure regulating valve when the part of the coupling pressure is fed back to the feedback port, so as to provide a reaction force against the control pressure inputted via the pressure receiving port, an elastic member to provide the reaction force against the control pressure inputted via the pressure receiving port, and a switching land to connect the output port to one of the input port and the discharge port in accordance with the force-equilibrium relationship between the elastic member, the coupling pressure fed back via the feedback port, and the control pressure inputted via the pressure receiving port.

The switching land may include a first land portion to receive the control pressure or the line pressure inputted via the pressure receiving port, a second land portion to selectively connect the output port to the discharge port, and a third land portion to selectively connect the output port to the input port and to receive the reaction force, and the first to third land portions may cooperate with each other, and facing pressure receiving sides of the second and third land portions may have the same area as each other.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, exemplary embodiments of a pressure control system for use with an automatic transmission according to the present invention will be described with reference to the accompanying drawings.

A plurality of embodiments of the pressure control system for use with an automatic transmission according to the present invention may exist, and hereinafter, most exemplary embodiments will be explained.

Figure 1:
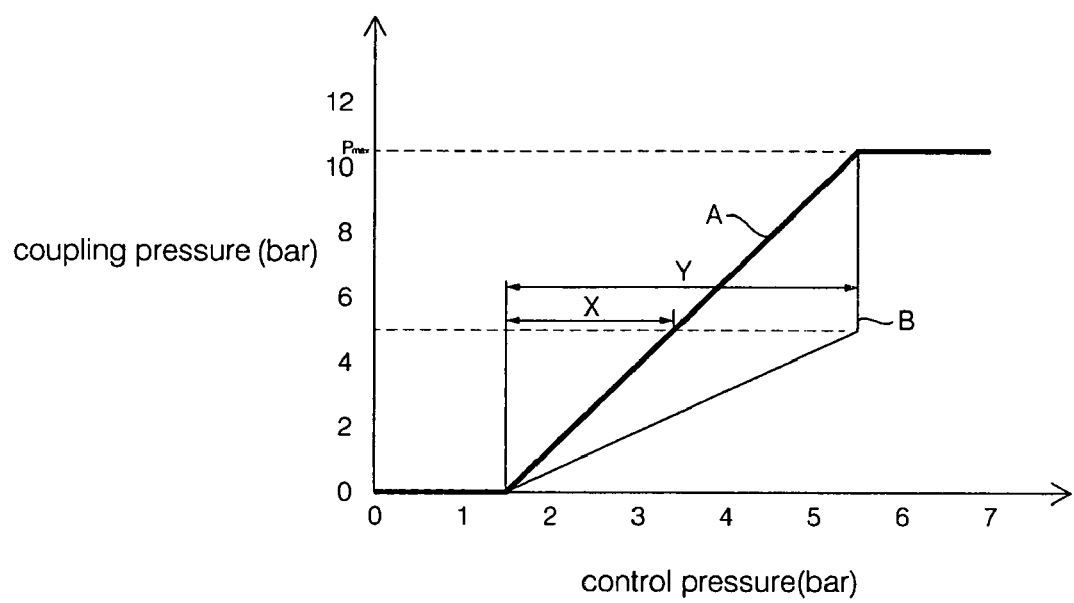
FIG. 1 is a graph illustrating the relationship between a coupling pressure and a control pressure attained by a conventional pressure control system.
Figure 2:
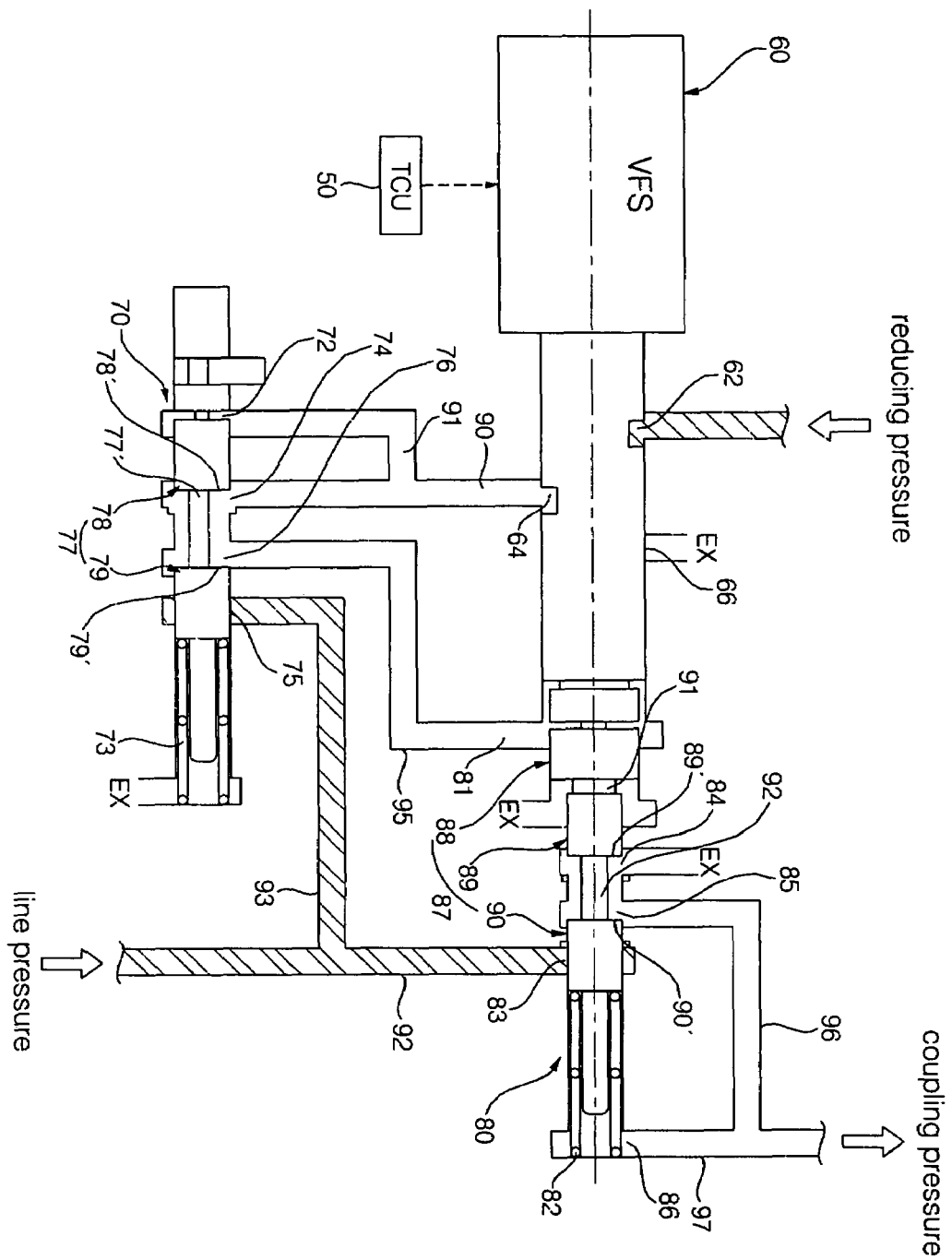
FIG. 2 is a schematic diagram illustrating the non-operating state of a pressure control system for an automatic transmission according to a first embodiment of the present invention.
Figure 3:
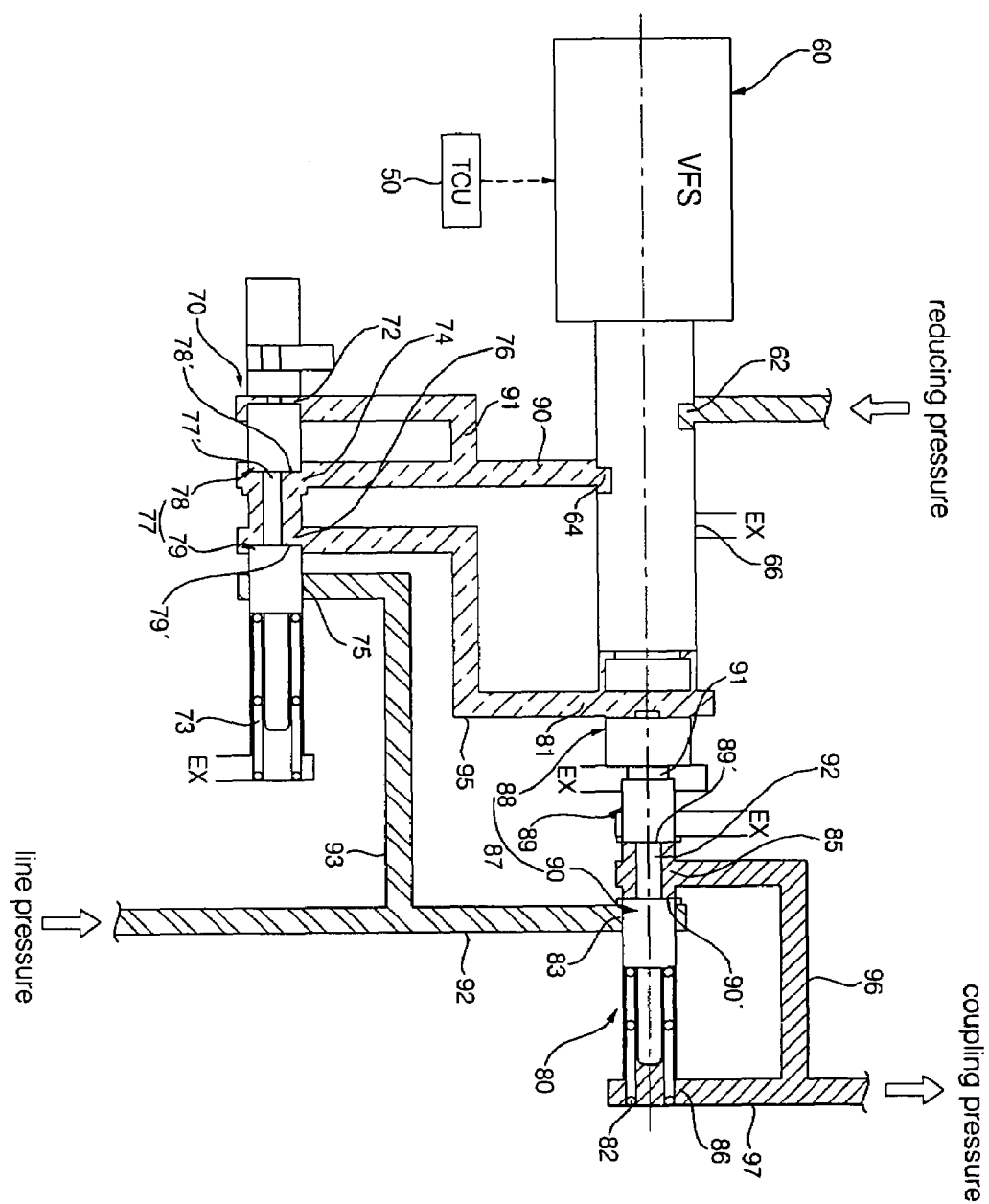
FIG. 3 is a schematic diagram illustrating the gear shifting of the pressure control system of FIG. 2.
Figure 4:
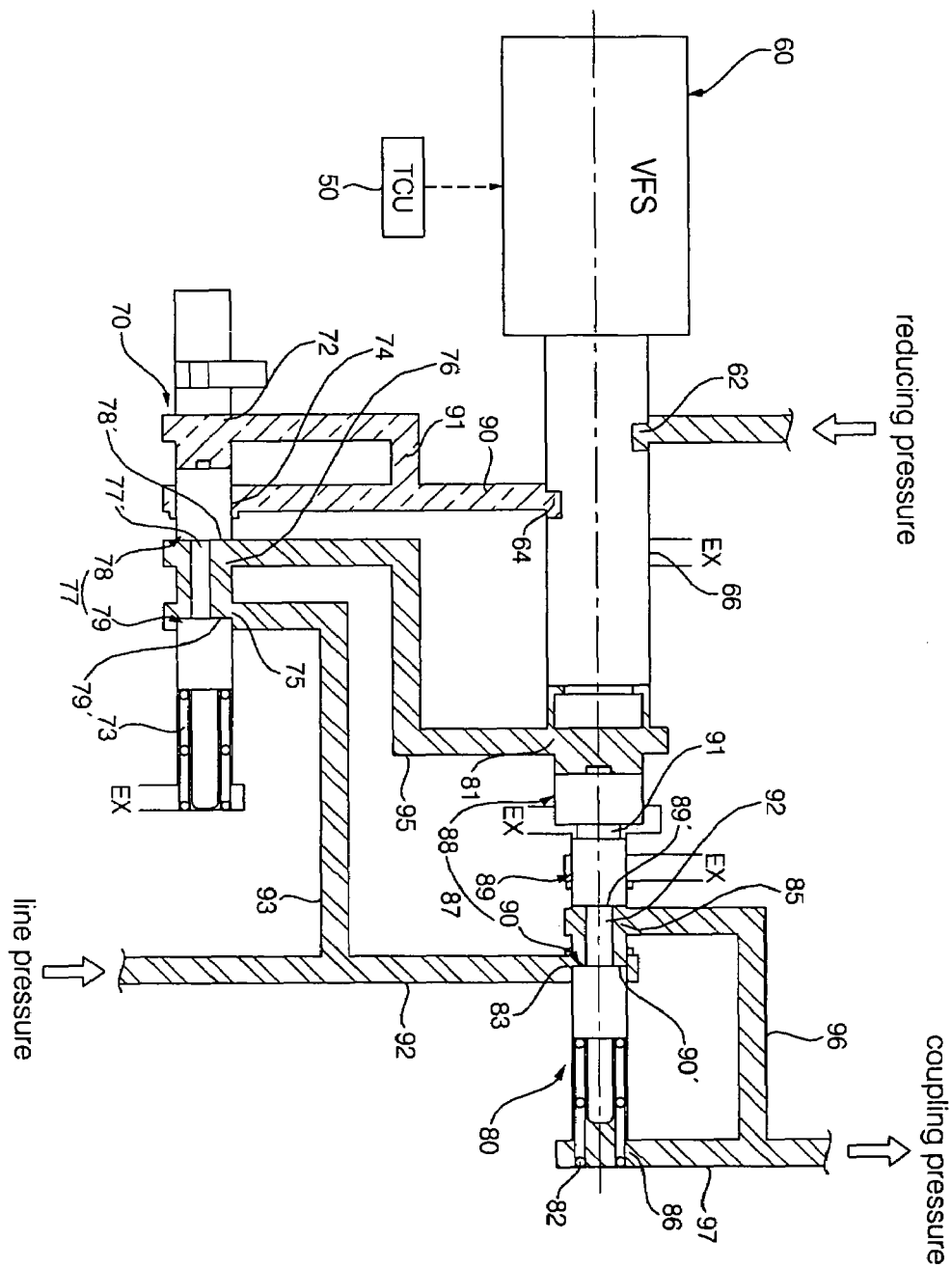
FIG. 4 is a schematic diagram illustrating a state after completion of the gear shifting of the pressure control system of FIG. 2.

As shown in FIGS. 2-4, a pressure control system for an automatic transmission according to the first embodiment of the present invention comprises: a control-pressure regulating valve 60 to regulate a reducing pressure to an appropriate control pressure in accordance with the control of a transmission control unit 50; a path switching valve 70 to output the control pressure regulated in the control-pressure regulating valve 60 during gear shifting and to output a line pressure after completion of the gear shifting; and a coupling-pressure regulating valve 80 to regulate a coupling pressure to be supplied to a frictional element of the automatic transmission based on the control pressure or line pressure outputted from the path switching valve 70.

The control-pressure regulating valve 60 may be a proportional-control solenoid valve, which regulates the control pressure in a variable manner in accordance with the duty control of the transmission control unit 50, and outputs the regulated control pressure. Transmission control unit 50 may comprise a process, memory and associated hardware, software or firmwares may be selected and programmed by a person of ordinary skill in the art based on the teachings set forth herein.

The control-pressure regulating valve 60 includes: a reducing-pressure input port 62; and a control-pressure output port 64. If the reducing pressure is inputted into the control-pressure regulating valve 60 via the input port 62, the reducing pressure is regulated to the control pressure in accordance with the duty control of the transmission control unit 50, so that the regulated control pressure is outputted via the output port 64. The control-pressure regulating valve 60 MAY further include a discharge port 66 to a surplus of the reducing pressure, inputted via the input port 62, to the outside.

The path switching valve 70 includes: a pressure receiving portion to receive the control pressure of the control-pressure regulating valve 60; a reaction force portion to provide a reaction force against the control pressure supplied to the pressure receiving portion; and an output pressure switching portion to output the control pressure or the line pressure of the control-pressure regulating valve 60 in accordance with the force-equilibrium relationship between the pressure receiving portion and the reaction force portion.

The pressure receiving portion of the path switching valve 70 includes a pressure receiving port 72, which is connected to the output port 64 of the control-pressure regulating valve 60 via a first control-pressure line 90 to receive the control pressure of the control-pressure regulating valve 60.

The reaction force portion of the path switching valve 70 includes an elastic member having an appropriate elasticity as determined by a person of ordinary skill. For example, the elastic member, forming the reaction force of the path switching valve 70, may be a coil type return spring 73. The return spring 73 of the path switching valve 70 is set to have a desired elasticity for allowing the path switching valve 70 to have a preset switching pressure value.

The output pressure switching portion of the path switching valve 70 includes: a first input port 74 to receive the control pressure of the control-pressure regulating valve 60; a second input port 75 to receive the line pressure; an output port 76 connected to the coupling-pressure regulating valve 60 via an output line 95 of the path switching valve 70; and a switching land 77 to connect the output port 76 of the path switching valve 70 to one of the first and second input ports 74 and 75 of the path switching valve 70 in accordance with the force-equilibrium relationship between the control pressure of the control-pressure regulating valve 60, inputted via the pressure receiving port 72 of the path switching valve 70, and the elasticity of the return spring 73.

The first input port 74 of the path switching valve 70 is connected to the output port 64 of the control-pressure regulating valve 60 via a second control-pressure line 91 that is branched from the first control-pressure line 90.

The second input port 75 of the path switching valve 70 is connected to a second line-pressure line 93 that is branched from a first line-pressure line 92. Here, the first-line-pressure line 92 is connected to the coupling-pressure regulating valve 80.

The switching land 77 of the path switching valve 70 includes a first land portion 78 to selectively connect the output port 76 of the path switching valve 70 to the first input port 74 of the path switching valve 70.

The first land portion 78 of the path switching valve 70 is adapted to receive the control pressure of the control-pressure regulating valve 60 inputted via the pressure receiving port 72 of the path switching valve 70.

The switching land 77 of the path switching valve 70 further includes a second land portion 79 to selectively connect the output port 76 of the path switching valve 70 to the second input port 75 of the path switching valve 70.

The second land portion 79 of the path switching valve 70 is adapted to receive the elasticity of the return spring 73.

The first and second land portions 78 and 79 of the path switching valve 70 are connected to each other via a land bridge 77', to cooperate with each other.

Also, the first and second land portions 78 and 79 of the path switching valve 70 are configured so that their facing pressure-receiving sides 78' and 79' have the same area as each other.

In the path switching valve 70 as stated above, the pressure receiving port 72, the first input port 74, the output port 76, and the second input port 75 are arranged in a line in this sequence.

The coupling-pressure regulating valve 80 includes: a pressure receiving portion to receive the control pressure or the line pressure outputted from the path switching valve 70; a reaction force portion to provide a reaction force against the pressure supplied to the pressure receiving portion of the coupling-pressure regulating valve 80; a coupling-pressure regulating portion to regulate the line pressure to the coupling pressure to be supplied to the frictional element in accordance with the force-equilibrium relationship between the pressure receiving portion and the reaction force portion of the coupling-pressure regulating valve 80; and a feedback portion to feedback part of the coupling pressure, outputted from the coupling-pressure regulating valve 80, into the reaction force portion.

The pressure receiving portion of the coupling-pressure regulating valve 80 includes a pressure receiving port 81, which is connected to the output port 76 of the path switching valve 70 via the output line 95 of the path switching valve 70, to receive the control pressure or the line pressure outputted from the path switching valve 70.

The reaction force portion of the coupling-pressure regulating valve 80 includes an elastic member having a desired elasticity. For example, the elastic member, forming the reaction force portion of the coupling-pressure regulating valve 80, may be a coil type return spring 82. The return spring 82 of the coupling-pressure regulating valve 80 is set to have a desired elasticity for allowing the coupling-pressure regulating valve 80 to have a preset reaction force value.

The coupling-pressure regulating portion of the coupling-pressure regulating valve 80 includes: an input port 83 connected to the first line-pressure line 92 to receive the line pressure; a discharge port 84 to discharge a surplus of the coupling pressure, supplied from the coupling-pressure regulating valve 80, to the outside; an output port 85 connected to the frictional element via a coupling-pressure output line 96 to output the coupling pressure regulated in the coupling-pressure regulating valve 80; and a feedback port 86 to receive part of the coupling pressure outputted from the output port 85 of the coupling-pressure regulating valve 80 when the part of the coupling pressure is fed beck into the feedback port 86.

The feedback port 86 of the coupling-pressure regulating valve 80 is connected to a feedback line 97 that is branched from the coupling-pressure output line 96.

The coupling-pressure regulating portion of the coupling-pressure regulating valve 80 further includes a switching land 87 to connect the output port 85 of the coupling-pressure regulating valve 80 to the input port 83 or the discharge port 84 of the coupling-pressure regulating valve 80 in accordance with the force-equilibrium relationship between the control pressure of the pressure receiving port 81, the control pressure of the return spring 82, and the coupling pressure fed back into the feedback port 86 of the coupling-pressure regulating valve 80.

The switching land 87 of the coupling-pressure regulating valve 80 includes: a first land portion 88 to receive the control pressure or the line pressure of the path switching valve 70 inputted via the pressure receiving port 81 of the coupling-pressure regulating valve 80; a second land portion 89 to selectively connect the output port 85 of the coupling-pressure regulating valve 80 to the discharge port 84; and a third land portion 90 to selectively connect the output port 85 of the coupling-pressure regulating valve 80 to the input port 83.

The first, second, and third land portions 88, 89, and 90 of the coupling-pressure regulating valve 80 are arranged in a line in this sequence, and are connected to each other via land bridges 91 and 92 to cooperate with each other.

The second and third land portions 89 and 90 of the coupling-pressure regulating valve 80 are configured so that their facing pressure-receiving sides 89' and 90' have the same area as each other.

The third land portion 90 of the coupling-pressure regulating valve 80 is adapted to receive the elasticity of the return spring 82 of the coupling-pressure regulating valve 80 and the coupling pressure fed back into the feedback port 86 of the coupling-pressure regulating valve 80.

In the coupling-pressure regulating valve 80 having the above-described configuration, the pressure receiving port 81, the discharge port 84, the output port 85, the input port 83, and the feedback port 86 are arranged in a line in this sequence.

Operation of a pressure control system of the automatic transmission in accordance with the first embodiment of the present invention having the above-described configuration will be explained.

As shown in FIG. 2, if the frictional element is in a non-operating state, the control-pressure regulating valve 60 does not output the control pressure in accordance with the duty control of the transmission control unit 50.

The output port 76 and the first input port 74 of the path switching valve 70 are connected to each other, and the second input port 75 of the path switching valve 70 is closed. In this case, since the control pressure of the control-pressure regulating valve 60 is not inputted into the path switching valve 70, the path switching valve 70 does not output both the control pressure and the line pressure of the control-pressure regulating valve 60.

The output port 85 and the discharge port 84 of the coupling-pressure regulating valve 80 are connected to each other, and the input port 83 of the coupling-pressure regulating valve 80 is closed.

Accordingly, the frictional element does not receive the coupling pressure of the coupling-pressure regulating valve 80, thereby being maintained in a non-operating state.

After that, if gear shifting is performed, as shown in FIG. 3, the control-pressure regulating valve 60 outputs the control pressure in accordance with the duty control of the transmission control unit 50.

In this case, the control pressure outputted from the control-pressure regulating valve 60 gradually rises to the appropriate control pressure determined in accordance with the duty control of the transmission control unit 50.

The control pressure of the control-pressure regulating valve 60 is inputted into the path switching valve 70.

As the control pressure of the control-pressure regulating valve 60 is inputted into the path switching valve 70, the switching land 77 of the path switching valve 70 is moved to compress the return spring 73 of the path switching valve 70.

Before the control pressure of the control-pressure regulating valve 60 reaches the appropriate control pressure determined in accordance with the duty control of the transmission control unit 50, the output port 76 and the first input port 74 of the path switching valve 70 are connected to each other, and the second input port 75 of the path switching valve 70 is closed.

Thereby, the path switching valve 70 outputs the control pressure of the control-pressure regulating valve 60.

The control pressure of the control-pressure regulating valve 60 outputted from the path switching valve 70 is inputted into the coupling-pressure regulating valve 80.

As the control pressure of the control-pressure regulating valve 60 is inputted into the coupling-pressure regulating valve 80, the switching land 87 of the coupling-pressure regulating valve 80 is moved, allowing the coupling pressure, which is required to operate the frictional element, to be regulated in the coupling-pressure regulating valve 80. The coupling pressure, regulated in the coupling-pressure regulating valve 80, is supplied to the frictional element via the coupling-pressure output line 96, enabling the implementation of gear shifting.

If the control pressure of the control-pressure regulating valve 60 reaches the appropriate control pressure determined in accordance with the duty control of the transmission control unit 50 during the gear shifting, the gear shifting is completed.

After completion of the gear shifting, the first input port 74 of the path switching valve 70 is closed, and the output port 76 and the second input port 75 of the path switching valve 70 are connected to each other. Accordingly, the path switching valve 70 outputs the line pressure.

As the coupling-pressure regulating valve 80 receives the line pressure from the path switching valve 70, the output port 85 and the input port 83 of the coupling-pressure regulating valve 80 are connected to each other.

Accordingly, the line pressure is inputted into the coupling-pressure regulating valve 80. The line pressure, inputted into the coupling-pressure regulating valve 80, is supplied to the frictional element via the output port 85 of the coupling-pressure regulating valve 80, thereby maintaining the completed state of the gear shifting.

Figure 5:
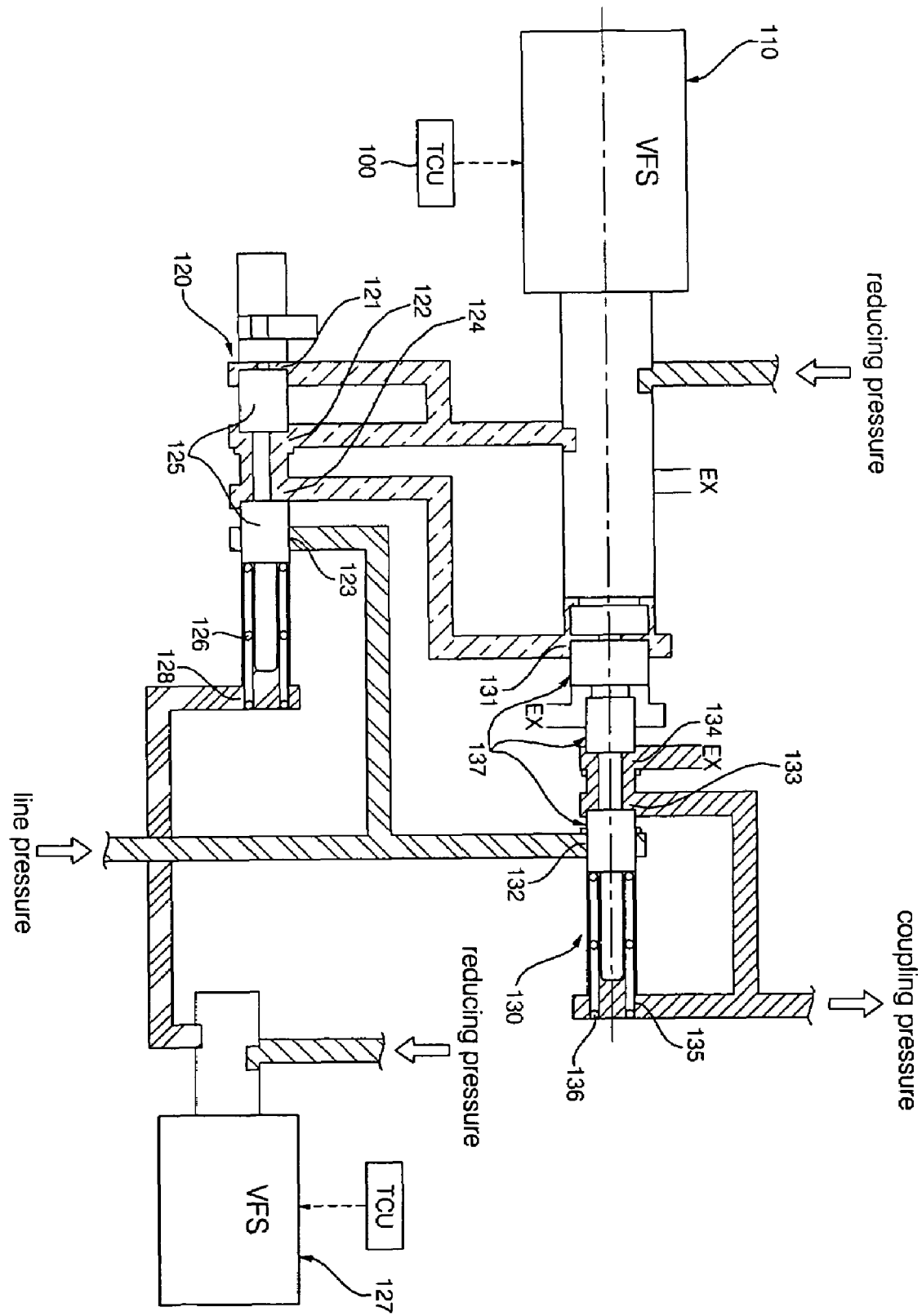
FIG. 5 is a schematic diagram illustrating the gear shifting of a pressure control system for an automatic transmission according to a second embodiment of the present invention.
Figure 6:
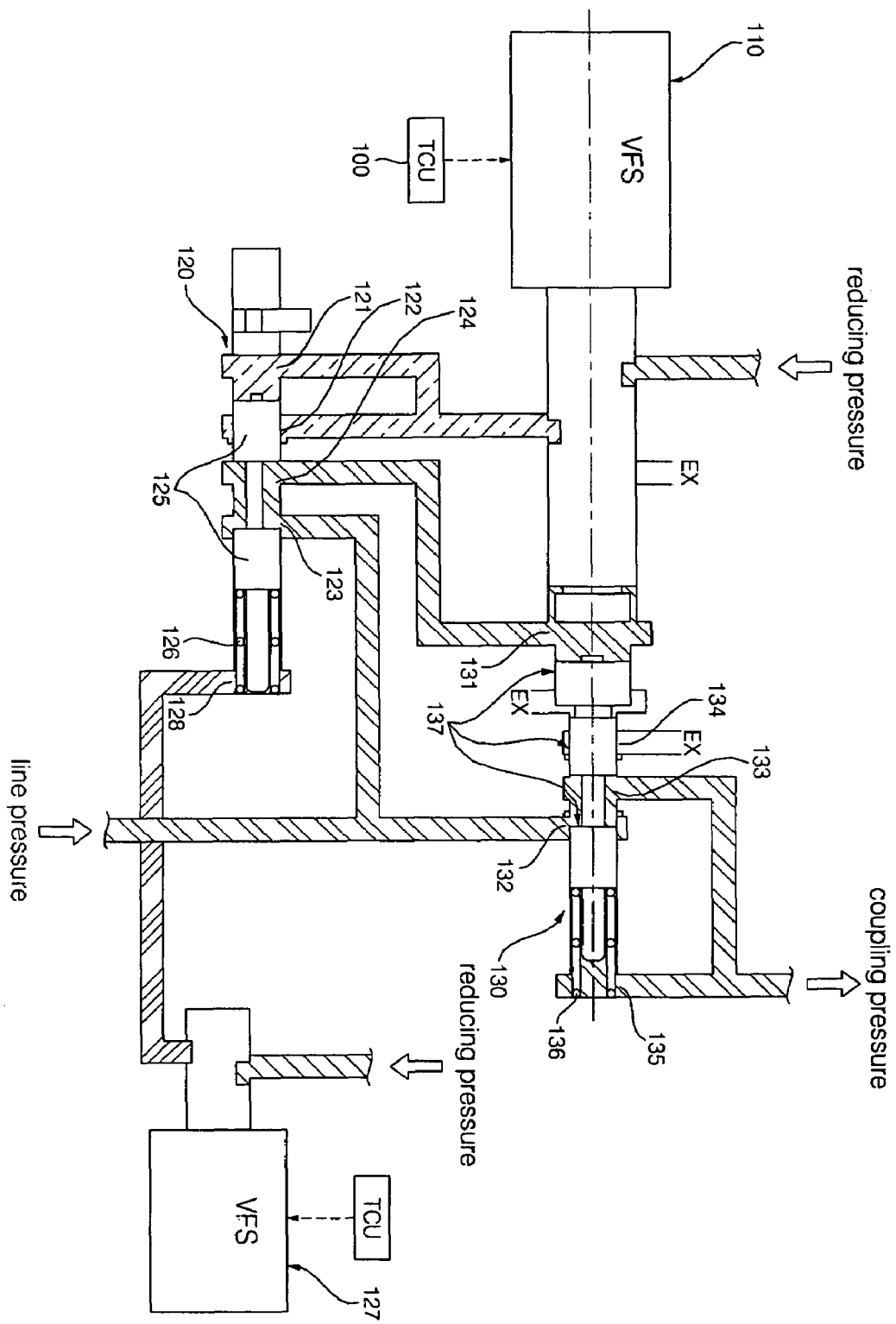
FIG. 6 is a schematic diagram illustrating a state after completion of the gear shifting of the pressure control system of FIG. 4.

Referring to FIGS. 5 and 6, a pressure control system of an automatic transmission according to a second embodiment of the present invention comprises: a control-pressure regulating valve 110 to output a control pressure in accordance with the duty control of a transmission control unit 100; a path switching valve 120 to output the control pressure or line pressure of the control-pressure regulating valve 110; and a coupling-pressure regulating valve 130 to regulate a coupling pressure to be supplied to a frictional element of the automatic transmission based on the control pressure or the line pressure of the control-pressure regulating valve 110 outputted from the path switching valve 120. Transmission control unit 120 may be configured as described above with respect to control until 50.

The path switching valve 120 includes: a pressure receiving port 121 and a first input port 122 to receive the control pressure of the control-pressure regulating valve 110; a second input port 123 to receive the line pressure; an output port 124 connected to the coupling-pressure regulating valve 130; a switching land 125 to switch connections between the output port 124 and the first input port 122 and between the output port 124 and the second input port 123; and a return spring 126 to provide a reaction force.

The path switching valve 120 further includes: a reaction force pressure regulating valve 127 to output an appropriate reaction force pressure, which can act as a reaction force of the path switching valve 120; and a reaction force pressure input port 128 to receive the reaction force pressure of the reaction force pressure regulating valve 127.

The reaction force regulating valve 127 is controlled in accordance with the duty control of the transmission control unit 100 to regulate the reducing pressure to the appropriate reaction force pressure.

The coupling-pressure regulating valve 130 includes: a pressure receiving port 131 to receive the control pressure or the line pressure of the control-pressure regulating valve 110 via the path switching valve 120; an input port 132 to receive the line pressure; an output port 133 connected to the frictional element; a discharge port 134; a feedback port 135 to receive part of the coupling pressure of the coupling-pressure regulating valve 130 if the part of the coupling pressure is fed back into the feedback port 135, so as to provide a reaction force; a return spring 136 to provide the reaction force; and a switching land 137 to switch a connection between the output port 133 and the input port 132 of the coupling-pressure regulating valve 130.

The other configuration of the second embodiment is identical to that of the first embodiment, and thus, no detailed description is given.

Now, the operation of the pressure control system in accordance with the second embodiment of the present invention having the above-described configuration will be explained.

As shown in FIG. 5, during gear shifting, the path switching valve 120 outputs the control pressure of the control-pressure regulating valve 110 to the coupling-pressure regulating valve 130 in accordance with the force-equilibrium relationship between the control pressure of the control-pressure regulating valve 110 inputted via the pressure receiving port 121 of the path switching valve 120, the elasticity of the return spring 126 of the path switching valve 120, and the reaction force pressure of the reaction force pressure regulating valve 127 inputted via the reaction force pressure input port 128 of the path switching valve 120.

Thereby, the coupling-pressure regulating valve 130 outputs the appropriate coupling pressure to the frictional element in accordance with the force-equilibrium relationship between the control pressure of the control-pressure regulating valve 110, the coupling pressure fed back via the feedback port 135 of the coupling-pressure regulating valve 130, and the elasticity of the return spring 136 of the coupling-pressure regulating valve 130.

After that, if the gear shifting is completed, as shown in FIG. 6, the path switching valve 120 outputs the line pressure to the coupling-pressure regulating valve 130, so that the coupling pressure of the coupling-pressure regulating valve rapidly rises to maintain the completed state of the gear shifting state.

Figure 7:
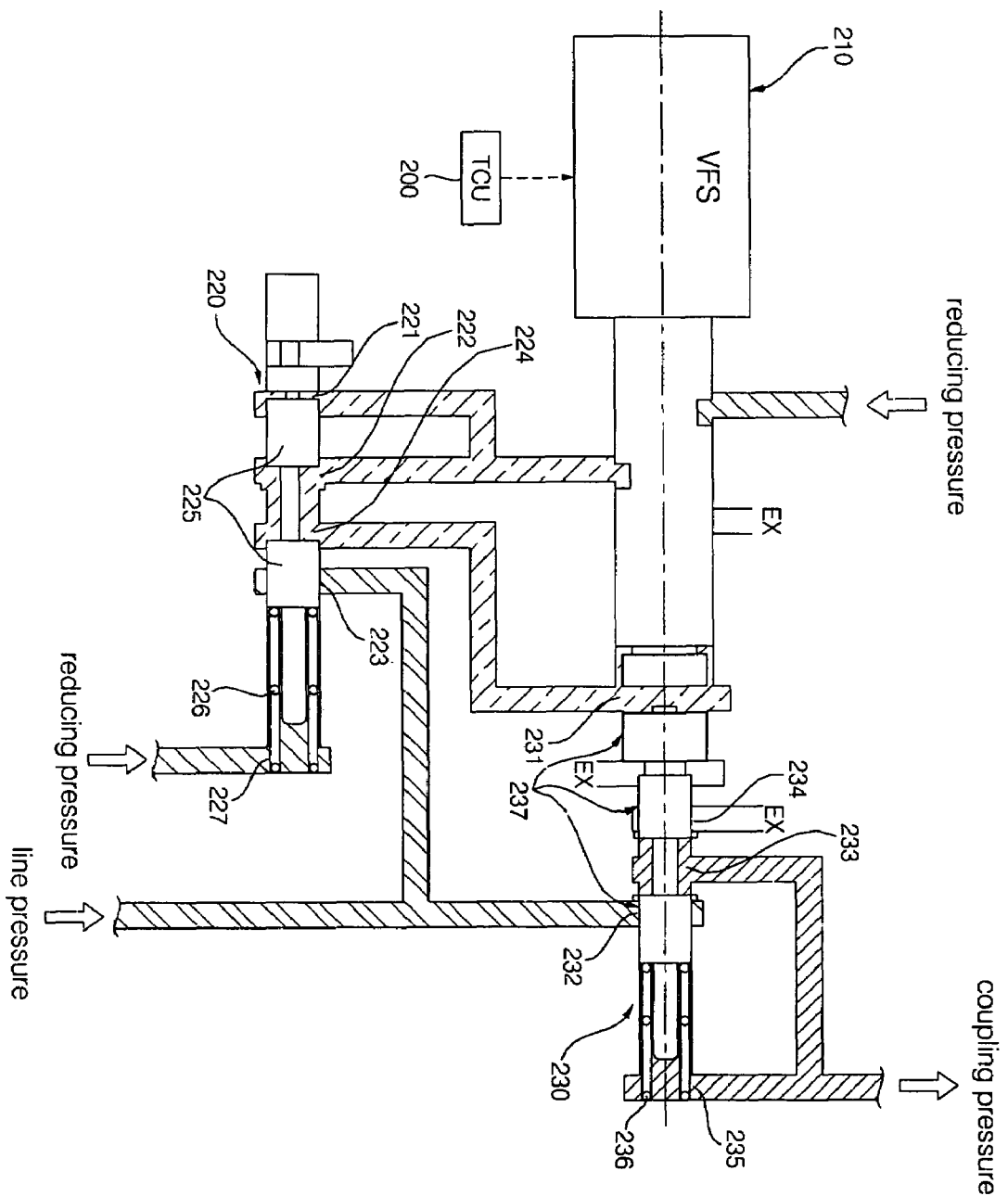
FIG. 7 is a schematic diagram illustrating the gear shifting of a pressure control system for an automatic transmission according to a third embodiment of the present invention.
Figure 8:
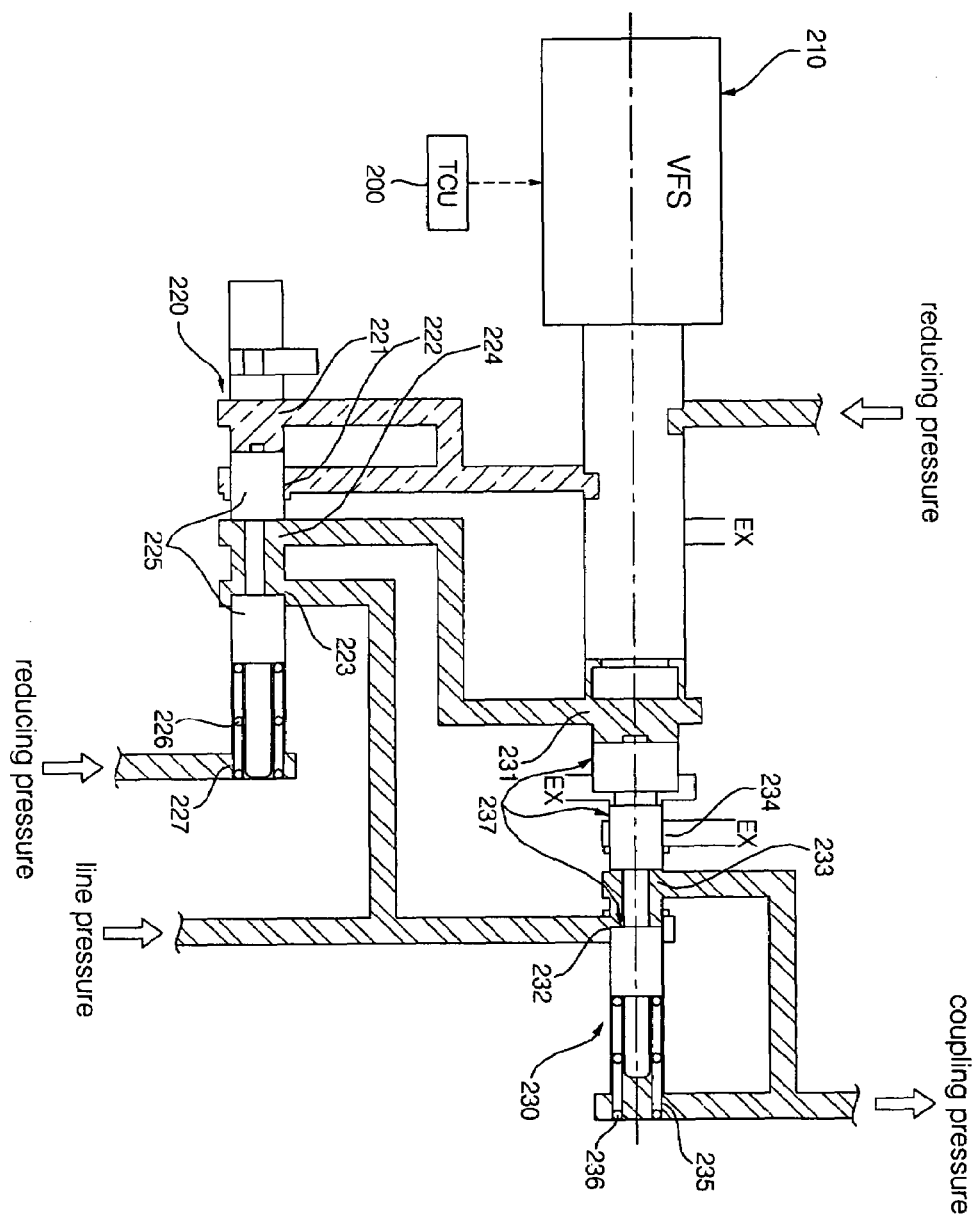
FIG. 8 is a schematic diagram illustrating a state after completion of the gear shifting of the pressure control system of FIG. 7.

Referring to FIGS. 7 and 8, a pressure control system of an automatic transmission according to a third embodiment of the present invention comprises: a control-pressure regulating valve 210 to output a control pressure in accordance with the duty control of a transmission control unit 200; a path switching valve 220 to output the control pressure or line pressure of the control-pressure regulating valve 210; and a coupling-pressure regulating valve 230 to regulate a coupling pressure to be supplied to a frictional element of the automatic transmission based on the control pressure or the line pressure of the control-pressure regulating valve 210 outputted from the path switching valve 220. Transmission control unit 200 may be configured as previously described.

The path switching valve 220 includes: a pressure receiving port 221 and a first input port 222 to receive the control pressure of the control-pressure regulating valve 210; a second input port 223 to receive the line pressure; an output port 224 connected to the coupling-pressure regulating valve 230; a switching land 225 to switch connections between the output port 224 and the first input port 222 and between the output port 224 and the second input port 223; and a return spring 226 to provide a reaction force.

The path switching valve 220 further includes a reaction force pressure input port 227 to receive a reducing pressure of the control-pressure regulating valve 210. This enables the reducing pressure, supplied to the control-pressure regulating valve 210, to act as a reaction force.

The coupling-pressure regulating valve 230 includes: a pressure receiving port 231 to receive the control pressure or the line pressure of the control-pressure regulating valve 210 via the path switching valve 220; an input port 232 to receive the line pressure; an output port 233 connected to the frictional element; a discharge port 234; a feedback port 235 to receive part of the coupling pressure of the coupling-pressure regulating valve 230 if the part of the coupling pressure is fed back into the feedback port 235, to provide a reaction force; a return spring 236 to provide the reaction force; and a switching land 237 to switch a connection between the output port 233 and the input port 232 of the coupling-pressure regulating valve 230.

Another configuration of the third embodiment is identical to that of the first embodiment, and thus, no detailed description is given.

Now, the operation of the pressure control system in accordance with the third embodiment of the present invention having the above-described configuration will be explained.

During gear shifting, the path switching valve 220 outputs the control pressure of the control-pressure regulating valve 210 to the coupling-pressure regulating valve 230 in accordance with the force-equilibrium relationship between the control pressure of the control-pressure regulating valve 210 inputted via the pressure receiving port 221 of the path switching valve 220, the elasticity of the return spring 226 of the path switching valve 220, and the reducing pressure inputted via the reaction force pressure input port 227 of the path switching valve 220.

Thereby, the coupling-pressure regulating valve 230 outputs the appropriate coupling pressure to the frictional element in accordance with the force-equilibrium relationship between the control pressure of the control-pressure regulating valve 210, the coupling pressure fed back via the feedback port 235 of the coupling-pressure regulating valve 230, and the elasticity of the return spring 236 of the coupling-pressure regulating valve 230.

After that, if the gear shifting is completed, the path switching valve 220 outputs the line pressure to the coupling-pressure regulating valve 230, so that the coupling pressure of the coupling-pressure regulating valve 230 rapidly rises to maintain the completed state of the gear shifting.

As apparent from the above description, in accordance with the pressure control system of the automatic transmission of the present invention, as shown in FIG. 3, when the coupling pressure of a coupling-pressure regulating valve, to be supplied to a frictional element of the automatic transmission, is approximately 0 bar to 5 bar, the control-pressure regulating range of a control-pressure regulating valve can be expanded to approximately 1.5 bar to 5.5 bar.

As a result of largely expanding the control-pressure regulating range Y of the control-pressure regulating valve as compared to the regulating range X of the prior art, the coupling-pressure regulating valve can achieve an effectively lowered sensibility for an input to output ratio.

In other words, according to the present invention, the control pressure, which is used to regulate the coupling pressure of the coupling-pressure regulating valve, has an expanded control range. This enables a more accurate regulation of the coupling pressure and prevents the generation of a shock during gear shifting, achieving an improvement in the quality of gear shifting.

Although exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A pressure control system of an automatic transmission comprising:
   a control-pressure regulating valve to regulate a reducing pressure to an appropriate control pressure in accordance with the control of a transmission control unit;
   a path switching valve to output the control pressure regulated in the control-pressure regulating valve during gear shifting, and to output a line pressure after completion of the gear shifting; and a coupling-pressure regulating valve to regulate a coupling pressure to be supplied to a frictional element based on the control pressure or the line pressure outputted from the path switching valve;

wherein the path switching valve includes:
- a pressure receiving port and a first input port to receive the control pressure of the control-pressure regulating valve, respectively;
- a second input port to receive the line pressure;
- an output port connected to the coupling-pressure regulating valve;
- a first reaction force portion to provide a reaction force against the control pressure inputted via the pressure receiving port; and
- a first switching land to connect the output port to one of the first and second input ports in accordance with a force-equilibrium relationship between the first reaction force portion and the control pressure inputted via the pressure receiving port.

2. The system as set forth in claim 1, wherein the control-pressure regulating valve is a proportional-control solenoid valve to allow the control pressure outputted from the control-pressure regulating valve to vary in accordance with the control of the transmission control unit.

3. The system as set forth in claim 1, wherein the reaction force portion includes an elastic member.

4. The system as set forth in claim 1, wherein the reaction force portion provides the reaction force by use of the reducing pressure of the control-pressure regulating valve.

5. The system as set forth in claim 1,
wherein the path switching valve further includes a reaction force pressure regulating valve to regulate the reducing pressure to an appropriate reaction force pressure in accordance with the control of the transmission control unit, and
wherein the reaction force portion provides the reaction force by use of the reaction force pressure of the reaction force pressure regulating valve.

6. The system as set forth in claim 1, wherein the path switching valve further includes:
- a reaction force pressure regulating valve controlled by the transmission control unit to provide a reaction force pressure; and
- a reaction force pressure input port to receive the reaction force pressure of the reaction force pressure regulating valve, so as to provide a reaction force against the control pressure inputted via the pressure receiving port.

7. The system as set forth in claim 1, wherein the path switching valve further includes a reaction force pressure input port to receive the reducing pressure of the control-pressure regulating valve, so as to provide a reaction force against the control pressure inputted via the pressure receiving port.

8. The system as set forth in claim 1, wherein the first switching land includes:
- a first land portion to selectively connect the output port to the first input port and to receive the control pressure inputted via the pressure receiving port; and
- a second land portion to selectively connect the output port to the second input port and to receive the reaction force, and wherein the first and second land portions cooperate with each other, and facing pressure-receiving sides of the first and second land portions have the same area as each other.

9. The system as set forth in claim 1, wherein the coupling-pressure regulating valve includes:
- a pressure receiving portion to receive the control pressure or the line pressure outputted from the path switching valve;
- a second reaction force portion to provide a reaction force against the pressure inputted into the pressure receiving portion;
- a coupling-pressure regulating portion to regulate the line pressure to the coupling pressure necessary to the frictional element in accordance with a force-equilibrium relationship between the pressure receiving portion and the reaction force portion; and
- a feedback portion to feedback part of the coupling pressure outputted from the coupling-pressure regulating valve, into the reaction force portion.

10. The system as set forth in claim 9, wherein the second reaction force portion includes an elastic member.

11. The system as set forth in claim 1, wherein the coupling-pressure regulating valve includes:
- a pressure receiving port to receive the control pressure or the line pressure outputted from the path switching valve;
- an input port to receive the line pressure;
- a discharge port to discharge the coupling pressure to the outside;
- an output port to output the coupling pressure to the frictional element;
- a feedback port to receive part of the coupling pressure outputted from the coupling-pressure regulating valve when the part of the coupling pressure is fed back to the feedback port, so as to provide a reaction force against the control pressure inputted via the pressure receiving port;
- an elastic member to provide the reaction force against the control pressure inputted via the pressure receiving port; and
- a second switching land to connect the output port to one of the input port and the discharge port in accordance with a force-equilibrium relationship between the elastic member, the coupling pressure fed back via the feedback port, and the control pressure inputted via the pressure receiving port.

12. The system as set forth in claim 11, wherein the second switching land includes:
- a first land portion to receive the control pressure or the line pressure inputted via the pressure receiving port;
- a second land portion to selectively connect the output port to the discharge port; and
- a third land portion to selectively connect the output port to the input port and to receive the reaction force, and
wherein the first to third land portions cooperate with each other, and facing pressure-receiving sides of the second and third land portions have the same area as each other.

* * * * *